US011268378B2

(12) United States Patent
Zhang et al.

(10) Patent No.: US 11,268,378 B2
(45) Date of Patent: Mar. 8, 2022

(54) DOWNHOLE WIRELESS COMMUNICATION NODE AND SENSOR/TOOLS INTERFACE

(71) Applicants: Yibing Zhang, Annandale, NJ (US); Limin Song, West Windsor, NJ (US); Katie M. Walker, Spring, TX (US); Mark M. Disko, Glen Gardner, NJ (US); Scott William Clawson, Califon, NJ (US); Patrick M. Moore, Katy, TX (US); David M. Chorneyko, Houston, TX (US)

(72) Inventors: Yibing Zhang, Annandale, NJ (US); Limin Song, West Windsor, NJ (US); Katie M. Walker, Spring, TX (US); Mark M. Disko, Glen Gardner, NJ (US); Scott William Clawson, Califon, NJ (US); Patrick M. Moore, Katy, TX (US); David M. Chorneyko, Houston, TX (US)

(73) Assignee: ExxonMobil Upstream Research Company, Spring, TX (US)

(\*) Notice: Subject to any disclaimer, the term of this patent is extended or adjusted under 35 U.S.C. 154(b) by 0 days.

(21) Appl. No.: 16/269,083

(22) Filed: Feb. 6, 2019

(65) Prior Publication Data
US 2019/0249548 A1  Aug. 15, 2019

Related U.S. Application Data

(60) Provisional application No. 62/800,202, filed on Feb. 1, 2019, provisional application No. 62/628,603, filed on Feb. 9, 2018.

(51) Int. Cl.
*E21B 47/16* (2006.01)
*H04W 4/38* (2018.01)
(Continued)

(52) U.S. Cl.
CPC .............. *E21B 47/16* (2013.01); *E21B 47/06* (2013.01); *H04L 67/12* (2013.01); *H04W 4/38* (2018.02); *E21B 47/12* (2013.01)

(58) Field of Classification Search
CPC .......... E21B 47/16; E21B 47/06; H04W 4/38; H04L 67/12
See application file for complete search history.

(56) References Cited

U.S. PATENT DOCUMENTS 3,103,643 A  9/1963  Kalbfell .......................... 340/17
3,205,477 A  9/1965  Kalbfell .......................... 340/18
(Continued)

FOREIGN PATENT DOCUMENTS

| CN | 102733799 | 6/2014 | ............. E21B 47/16 |
| EP | 0636763 | 2/1995 | ............. E21B 47/12 |

(Continued)

OTHER PUBLICATIONS

U.S. Appl. No. 15/666,334, filed Aug. 1, 2017, Walker, Katie M. et al.
(Continued)

*Primary Examiner* — Joseph H Feild
*Assistant Examiner* — Rufus C Point
(74) *Attorney, Agent, or Firm* — Leandro Arechederra, III

(57) ABSTRACT

In conjunction with a communication network, for example, a downhole wireless network for transmission of data along a tubular body, disclosed herein are: (1) a variety of hardware interfacing methods with sensors and downhole tools; (2) sensing concepts that are enabled by the unique interfaces; (3) physical implementation of the integrated sensor/communication node structures; (4) related software communication protocols. The interfaces may support both data communication and power transfer.

46 Claims, 6 Drawing Sheets

(51) Int. Cl.
  *E21B 47/06* (2012.01)
  *H04L 29/08* (2006.01)
  *E21B 47/12* (2012.01)
  *H04L 67/12* (2022.01)

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/81 |
| 4,302,826 A | 11/1981 | Kent et al. | 367/82 |
| 4,314,365 A | 2/1982 | Petersen et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/254 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,477,505 A * | 12/1995 | Drumheller | E21B 47/16 166/250.01 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,682,134 A * | 10/1997 | Stallbohm | B60R 25/1009 340/426.27 |
| 5,850,369 A | 12/1998 | Rorden et al. | 367/83 |
| 5,857,146 A | 1/1999 | Kido | 455/38.3 |
| 5,881,310 A * | 3/1999 | Airhart | G01V 3/20 710/3 |
| 5,924,499 A * | 7/1999 | Birchak | E21B 47/20 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,281,489 B1 * | 8/2001 | Tubel | E21B 47/113 250/227.14 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 13/152.03 |
| 6,360,769 B1 | 3/2002 | Brisco | 137/268 |
| 6,388,577 B1 * | 5/2002 | Carstensen | E21B 41/00 340/854.3 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,830 B2 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.6 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 13/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |

(56) References Cited

U.S. PATENT DOCUMENTS

| | | |
|---|---|---|
| 8,434,354 B2 | 5/2013 | Crow et al. .................. 73/152.04 |
| 8,494,070 B2 | 7/2013 | Luo et al. ...................... 375/262 |
| 8,496,055 B2 | 7/2013 | Mootoo et al. ............... 166/278 |
| 8,539,890 B2 | 9/2013 | Tripp et al. ...................... 109/25 |
| 8,544,564 B2 | 10/2013 | Moore et al. .................. 175/50 |
| 8,552,597 B2 | 10/2013 | Song et al. .................... 307/149 |
| 8,556,302 B2 | 10/2013 | Dole .............................. 285/367 |
| 8,559,272 B2 | 10/2013 | Wang |
| 8,596,359 B2 | 12/2013 | Grigsby et al. ............... 166/278 |
| 8,605,548 B2 | 12/2013 | Froelich ......................... 367/82 |
| 8,607,864 B2 | 12/2013 | Mcleod et al. ............. 166/250.1 |
| 8,664,958 B2 | 3/2014 | Simon ........................... 324/338 |
| 8,672,875 B2 | 3/2014 | Vanderveen et al. ........... 604/67 |
| 8,675,779 B2 | 3/2014 | Zeppetelle et al. ............ 375/340 |
| 8,683,859 B2 | 4/2014 | Godager ..................... 73/152.54 |
| 8,689,621 B2 | 4/2014 | Godager ..................... 73/152.54 |
| 8,701,480 B2 | 4/2014 | Eriksen ....................... 73/152.51 |
| 8,750,789 B2 | 6/2014 | Baldemair et al. ........... 455/11.1 |
| 8,787,840 B2 | 7/2014 | Srinivasan et al. .............. 455/69 |
| 8,805,632 B2 | 8/2014 | Coman et al. .................. 702/89 |
| 8,826,980 B2 | 9/2014 | Neer ........................... 166/255.1 |
| 8,833,469 B2 | 9/2014 | Purkis ............................ 166/373 |
| 8,893,784 B2 | 11/2014 | Abad ........................... E21B 43/26 |
| 8,910,716 B2 | 12/2014 | Newton et al. ................ 166/373 |
| 8,994,550 B2 | 3/2015 | Millot et al. ............... E21B 47/16 |
| 8,995,837 B2 | 3/2015 | Mizuguchi et al. ... H04B 10/27 |
| 9,062,508 B2 | 6/2015 | Huval et al. ........... E21B 47/122 |
| 9,062,531 B2 | 6/2015 | Jones ....................... E21B 47/082 |
| 9,075,155 B2 | 7/2015 | Luscombe et al. ..... G01V 1/226 |
| 9,078,055 B2 | 7/2015 | Nguyen et al. ............. H04R 5/00 |
| 9,091,153 B2 | 7/2015 | Yang et al. ................ E21B 47/12 |
| 9,133,705 B2 | 9/2015 | Angeles Boza ........ E21B 47/12 |
| 9,140,097 B2 | 9/2015 | Themig et al. ............ E21B 34/12 |
| 9,144,894 B2 | 9/2015 | Barnett et al. ............. B25B 17/00 |
| 9,206,645 B2 | 12/2015 | Hallundbaek ............... E21B 7/04 |
| 9,279,301 B2 | 3/2016 | Lovorn et al. ........... E21B 21/103 |
| 9,284,819 B2 | 3/2016 | Tolman et al. ............ E21B 41/00 |
| 9,284,834 B2 | 3/2016 | Alteirac et al. ............ E21B 47/12 |
| 9,310,510 B2 | 4/2016 | Godager ..................... G01V 3/38 |
| 9,333,350 B2 | 5/2016 | Rise et al. ........... A61N 1/36082 |
| 9,334,696 B2 | 5/2016 | Hay ........................... E21B 47/12 |
| 9,359,841 B2 | 6/2016 | Hall ............................ E21B 23/00 |
| 9,363,605 B2 | 6/2016 | Goodman et al. ...... H04R 17/00 |
| 9,376,908 B2 | 6/2016 | Ludwig et al. .......... E21B 47/01 |
| 9,441,470 B2 | 9/2016 | Guerrero et al. ........ E21B 43/14 |
| 9,515,748 B2 | 12/2016 | Jeong et al. ................ G10L 25/90 |
| 9,557,434 B2 | 1/2017 | Keller et al. .............. G01V 1/52 |
| 9,617,829 B2 | 4/2017 | Dale et al. ................ E21B 41/00 |
| 9,617,850 B2 | 4/2017 | Fripp et al. ............... E21B 47/18 |
| 9,631,485 B2 | 4/2017 | Keller et al. .............. E21B 47/16 |
| 9,657,564 B2 | 5/2017 | Stolpman ................. E21B 47/16 |
| 9,664,037 B2 | 5/2017 | Logan et al. ........... E21B 47/122 |
| 9,670,773 B2 | 6/2017 | Croux ....................... E21B 47/16 |
| 9,683,434 B2 | 6/2017 | Machocki ................. E21B 44/00 |
| 9,686,021 B2 | 6/2017 | Merino ...................... E21B 47/16 |
| 9,715,031 B2 | 7/2017 | Contant et al. ......... E21B 47/122 |
| 9,721,448 B2 | 8/2017 | Wu et al. .................. G08B 21/20 |
| 9,759,062 B2 | 9/2017 | Deffenbaugh et al. .......................... E21B 47/16 |
| 9,816,373 B2 | 11/2017 | Howell et al. ............ E21B 47/16 |
| 9,822,634 B2 | 11/2017 | Gao ........................... E21B 47/16 |
| 9,863,222 B2 | 1/2018 | Morrow et al. ........ E21B 43/122 |
| 9,879,525 B2 | 1/2018 | Morrow et al. .......... E21B 47/12 |
| 9,945,204 B2 | 4/2018 | Ross et al. ................. E21B 33/00 |
| 9,963,955 B2 | 5/2018 | Tolman et al. ........... E21B 43/119 |
| 10,100,635 B2 | 10/2018 | Keller et al. .............. E21B 47/18 |
| 10,103,846 B2 | 10/2018 | van Zelm et al. ........ E21B 47/12 |
| 10,132,149 B2 | 11/2018 | Morrow et al. ....... E21B 43/267 |
| 10,145,228 B2 | 12/2018 | Yarus et al. ............... E21B 44/00 |
| 10,167,716 B2 | 1/2019 | Clawson et al. ......... E21B 47/14 |
| 10,167,717 B2 | 1/2019 | Deffenbaugh et al. .......................... E21B 47/16 |
| 10,190,410 B2 | 1/2019 | Clawson et al. ......... E21B 47/14 |
| 10,196,862 B2 | 2/2019 | Li-Leger et al. ........ E21B 17/02 |
| 10,404,383 B2 * | 9/2019 | Ringgenberg .......... E21B 47/16 |
| 10,858,934 B2 * | 12/2020 | Peters ..................... E21B 49/00 |
| 2002/0126021 A1 * | 9/2002 | Vinegar .................. E21B 47/12 340/854.3 |
| 2002/0136187 A1 * | 9/2002 | Aoyama ................. H04W 16/28 370/342 |
| 2002/0180613 A1 | 12/2002 | Shi et al. .................. E21B 47/18 |
| 2003/0056953 A1 | 3/2003 | Tumlin et al. ................ 166/298 |
| 2003/0117896 A1 | 6/2003 | Sakuma et al. ................. 367/81 |
| 2003/0151977 A1 * | 8/2003 | Shah ........................ E21B 47/18 367/82 |
| 2003/0217138 A1 * | 11/2003 | Shimba ..................... H04L 29/06 709/223 |
| 2004/0020063 A1 | 2/2004 | Lewis et al. ..................... 33/313 |
| 2004/0200613 A1 | 10/2004 | Fripp et al. .............. 166/250.01 |
| 2004/0239521 A1 | 12/2004 | Zierolf ........................ 340/854.1 |
| 2005/0269083 A1 | 12/2005 | Burris, II et al. ......... 166/255.2 |
| 2005/0284659 A1 | 12/2005 | Hall et al. ......................... 175/27 |
| 2006/0033638 A1 | 2/2006 | Hall et al. .................... 340/854.6 |
| 2006/0041795 A1 | 2/2006 | Gabelmann et al. .......... 714/699 |
| 2006/0090893 A1 | 5/2006 | Sheffield .................. 166/250.15 |
| 2006/0187755 A1 * | 8/2006 | Tingley ..................... E21B 47/16 367/82 |
| 2007/0139217 A1 | 6/2007 | Beique et al. ............... 340/856.3 |
| 2007/0146351 A1 | 6/2007 | Katsuhira et al. .......... 345/179 |
| 2007/0156359 A1 | 7/2007 | Varsamis et al. .............. 702/69 |
| 2007/0198192 A1 * | 8/2007 | Hsu .......................... H03M 7/30 702/6 |
| 2007/0219758 A1 | 9/2007 | Bloomfield ................... 702/190 |
| 2007/0272411 A1 | 11/2007 | Lopez de Cardenas et al. ........... 166/305.1 |
| 2008/0030365 A1 | 2/2008 | Fripp et al. .............. E21B 47/16 |
| 2008/0037485 A1 * | 2/2008 | Osinga .................... H04L 45/00 370/338 |
| 2008/0060846 A1 * | 3/2008 | Belcher .................... E21B 47/13 175/25 |
| 2008/0110644 A1 | 5/2008 | Howell et al. ................. 166/387 |
| 2008/0185144 A1 | 8/2008 | Lovell ....................... 166/250.17 |
| 2008/0304360 A1 | 12/2008 | Mozer ............................ 367/117 |
| 2009/0003133 A1 | 1/2009 | Dalton et al. .................... 367/82 |
| 2009/0030614 A1 | 1/2009 | Carnegie et al. ................. 702/6 |
| 2009/0034368 A1 | 2/2009 | Johnson .......................... 367/83 |
| 2009/0045974 A1 | 2/2009 | Patel .......................... 340/854.6 |
| 2009/0080291 A1 | 3/2009 | Tubel et al. ..................... 367/81 |
| 2009/0166031 A1 | 7/2009 | Hernandez .............. 166/250.01 |
| 2009/0171767 A1 * | 7/2009 | Kolessar ................. G06Q 30/0203 705/7.32 |
| 2009/0289808 A1 * | 11/2009 | Prammer .................. E21B 17/003 340/853.7 |
| 2010/0013663 A1 | 1/2010 | Cavender et al. ......... 340/854.3 |
| 2010/0039898 A1 * | 2/2010 | Gardner ................... E21B 47/16 367/82 |
| 2010/0089141 A1 | 4/2010 | Rioufol et al. ............ 13/152.28 |
| 2010/0112631 A1 | 5/2010 | Hur et al. ......................... 435/39 |
| 2010/6133004 | 6/2010 | Burleson et al. ................ 175/2 |
| 2010/0182161 A1 | 7/2010 | Robbins et al. ........... 340/853.7 |
| 2010/0212891 A1 | 8/2010 | Stewart et al. ............ 166/250.12 |
| 2011/0061862 A1 | 3/2011 | Loretz et al. ............. 166/250.11 |
| 2011/0066378 A1 | 3/2011 | Lerche et al. ..................... 702/6 |
| 2011/0168403 A1 | 7/2011 | Patel ............................. 166/373 |
| 2011/0188345 A1 | 8/2011 | Wang ............................. 367/34 |
| 2011/0297376 A1 | 12/2011 | Holderman et al. ............ 166/278 |
| 2011/0297673 A1 | 12/2011 | Zbat et al. ..................... 219/756 |
| 2011/0301439 A1 | 12/2011 | Albert et al. .................. 600/301 |
| 2011/0315377 A1 | 12/2011 | Rioufol ..................... 166/250.17 |
| 2012/0043079 A1 | 2/2012 | Wassouf et al. ............... 166/250 |
| 2012/0126992 A1 | 5/2012 | Rodney et al. .............. 340/850 |
| 2012/0152562 A1 | 6/2012 | Newton et al. ................ 166/369 |
| 2012/0179377 A1 | 7/2012 | Lie ..................................... 702/6 |
| 2012/0250461 A1 * | 10/2012 | Millot ...................... H04B 11/00 367/82 |
| 2013/0000981 A1 | 1/2013 | Grimmer et al. ............... 175/45 |
| 2013/0003503 A1 | 1/2013 | L'Her et al. .................. 367/106 |
| 2013/0106615 A1 | 5/2013 | Prammer ..................... 340/854.6 |
| 2013/0138254 A1 | 5/2013 | Seals et al. .................... 700/282 |
| 2013/0192823 A1 | 8/2013 | Barrilleaux et al. ...... 166/250.01 |
| 2013/0278432 A1 | 10/2013 | Shashoua et al. ........... 340/853.7 |
| 2013/0319102 A1 | 12/2013 | Riggenberg et al. ....... 73/152.28 |
| 2014/0060840 A1 | 3/2014 | Hartshorne et al. ........... 166/300 |

(56) References Cited

U.S. PATENT DOCUMENTS

| | | | |
|---|---|---|---|
| 2014/0062715 A1 | 3/2014 | Clark | 340/853.2 |
| 2014/0077964 A1* | 3/2014 | Beligere | E21B 47/06 |
| | | | 340/853.3 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0210633 A1* | 7/2014 | Hrametz | E21B 23/01 |
| | | | 340/854.4 |
| 2014/0266769 A1 | 9/2014 | van Zelm | 340/854.3 |
| 2014/0269744 A1* | 9/2014 | Flanders | G06F 11/20 |
| | | | 370/401 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0053484 A1* | 2/2015 | Meister | E21B 7/062 |
| | | | 175/26 |
| 2015/0107855 A1* | 4/2015 | Murphree | E21B 33/134 |
| | | | 166/381 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0047236 A1* | 2/2016 | Croux | H04B 11/00 |
| | | | 367/82 |
| 2016/0076363 A1 | 3/2016 | Morrow et al. | E21B 47/12 |
| 2016/0084076 A1* | 3/2016 | Fanini | H04L 67/12 |
| | | | 340/853.1 |
| 2016/0109606 A1 | 4/2016 | Market et al. | G01V 1/50 |
| 2016/0177673 A1* | 6/2016 | Merron | E21B 21/10 |
| | | | 166/250.01 |
| 2016/0215612 A1 | 7/2016 | Morrow | E21B 47/122 |
| 2016/0273348 A1* | 9/2016 | Echols, III | E21B 17/206 |
| 2016/0356152 A1* | 12/2016 | Croux | H04W 40/12 |
| 2017/0134101 A1* | 5/2017 | Ringgenberg | E21B 47/16 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2017/0335681 A1* | 11/2017 | Nguyen | E21B 17/003 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |
| 2019/0112913 A1 | 4/2019 | Song et al. | E21B 47/01 |
| 2019/0112915 A1 | 4/2019 | Disko et al. | E21B 47/14 |
| 2019/0112916 A1* | 4/2019 | Song | G01V 1/44 |
| 2019/0112917 A1 | 4/2019 | Disko et al. | E21B 47/14 |
| 2019/0112918 A1 | 4/2019 | Yi et al. | E21B 4/16 |
| 2019/0112919 A1 | 4/2019 | Song et al. | E21B 47/16 |
| 2019/0116085 A1* | 4/2019 | Zhang | H04Q 9/00 |
| 2019/0153849 A1* | 5/2019 | Kent | E21B 47/18 |
| 2019/0153857 A1* | 5/2019 | Yi | E21B 47/14 |
| 2020/0141229 A1* | 5/2020 | Croux | H04B 11/00 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/175,441, filed Oct. 30, 2018, Song, Limin et al.
U.S. Appl. No. 16/175,467, filed Oct. 30, 2018, Kinn, Timothy F. et al.
U.S. Appl. No. 16/175,488, filed Oct. 30, 2018, Yi, Xiaohua et al.
U.S. Appl. No. 16/220,327, filed Dec. 14, 2018, Disko, Mark M. et al.
U.S. Appl. No. 16/220,332, filed Dec. 14, 2018, Yi, Xiaohua et al.
U.S. Appl. No. 16/269,083, filed Feb. 6, 2019, Zhang, Yibing.
U.S. Appl. No. 16/267,950, filed Feb. 5, 2019, Walker, Katie M. et al.
U.S. Appl. No. 62/782,153, filed Dec. 19, 2019, Yi, Xiaohua et al.
U.S. Appl. No. 62/782,160, filed Dec. 19, 2018, Hall, Timothy J. et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downbole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data in the Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.

* cited by examiner

DOWNHOLE WIRELESS COMMUNICATION NODE AND SENSOR/TOOLS INTERFACE

CROSS REFERENCE TO RELATED APPLICATIONS

This application claims priority to U.S. Patent Application No. 62/628,603, filed Feb. 9, 2018 entitled "Downhole Wireless Communication Node and Sensor/Tools Interface" and U.S. Patent Application No. 62/800,202, filed Feb. 1, 2019 entitled "Downhole Wireless Communication Node and Sensor/Tools Interface" the disclosures of which are incorporated herein by reference in their entirety.

This application is related to U.S. patent application Ser. No. 15/666,324, filed Aug. 1, 2017 entitled "Methods of Acoustically Communicating And Wells That Utilize The Methods," U.S. patent application Ser. No. 15/665,952, filed Aug. 31, 2016 entitled "Plunger Lift Monitoring Via A Downhole Wireless Network Field," U.S. patent application Ser. No. 15/666,356, filed Aug. 1, 2017 entitled "Methods of Acoustically Communicating And Wells That Utilize The Methods," and U.S. Provisional Application No. 62/608,172, filed Dec. 20, 2017 entitled "Energy Efficient Method of Retrieving Wireless Networked Sensor Data," the disclosures of which are incorporated herein by reference in their entirety.

FIELD OF THE DISCLOSURE

The present disclosure relates generally to methods of acoustically communicating and/or to wells that use the methods.

BACKGROUND OF THE DISCLOSURE

An acoustic wireless network may be used to wirelessly transmit an acoustic signal, such as a vibration, via a tone transmission medium. Downhole wireless communication through the casing has been proven to be a novel and valuable technology for many U/S applications, e.g., optimized drilling, completions, and well management. Three field experiments have been carried out in the past. A low cost long range (~100 feet/hop) ultrasonic acoustic communication has been proven feasible. This unique capability enables real time monitoring of down hole conditions, e.g. temperature, pressure, flow, electric conductivity, pH, acoustics, etc. Meanwhile, there are already sensors available in the market for measurements of those parameters in downhole environment, which are very often integrated in wired communication systems. In addition, there are downhole tools that control production activities that must currently be controlled via wireline or other means that may be integrated with a downhole wireless network. With this new downhole wireless communication system, the interface between the communication node and sensors/tools are still lacking.

The interface is challenging due to harsh conditions in downhole environment, such as high T, high P and corrosive conditions. The interface itself has to survive these conditions, and provide dual functions: one is to keep the integrity of both the communication node and sensor/tool under such environment, the other is to provide reliable connection for information to flow among sensor/tool and nodes.

To build an open architecture for the DWN communication system and sensors/tools, an interface that can be integrated with the communication node and sensors/tools have to be developed, including both the physical interfacing methods and software communication protocols.

SUMMARY OF THE DISCLOSURE

Systems and methods of acoustically communicating and wells that use the methods are disclosed herein. The methods generally use an acoustic wireless network including a plurality of nodes spaced-apart along a length of a tone transmission medium. According to disclosed aspects, there is provided a method of communication using a wireless network, such as an acoustic wireless network using one or more well components as a tone transmission medium as described herein. Included are: (1) a variety of hardware interfacing methods with sensors and downhole tools; (2) sensing concepts that are enabled by the unique interfaces; (3) physical implementation of the integrated sensor/communication node structures; (4) related software communication protocols. The interfaces may support both data communication and power transfer.

According to an aspect of the disclosure, a method of communicating in a wellbore is disclosed. A downhole communication network includes a plurality of communicating devices. Each of the devices transmits and/or receives messages to or from another of the devices using one or more communicating interfaces. Each communicating interface includes at least one of a transmitter and a receiver associated with the device, and a communicating medium through which messages are transmitted and/or received by the device. One or more device attributes are determined for one of the devices. Based on the attributes, a least one of a communicating interface and a communicating rate is selected.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

DETAILED DESCRIPTION AND BEST MODE OF THE DISCLOSURE

Figure 1:
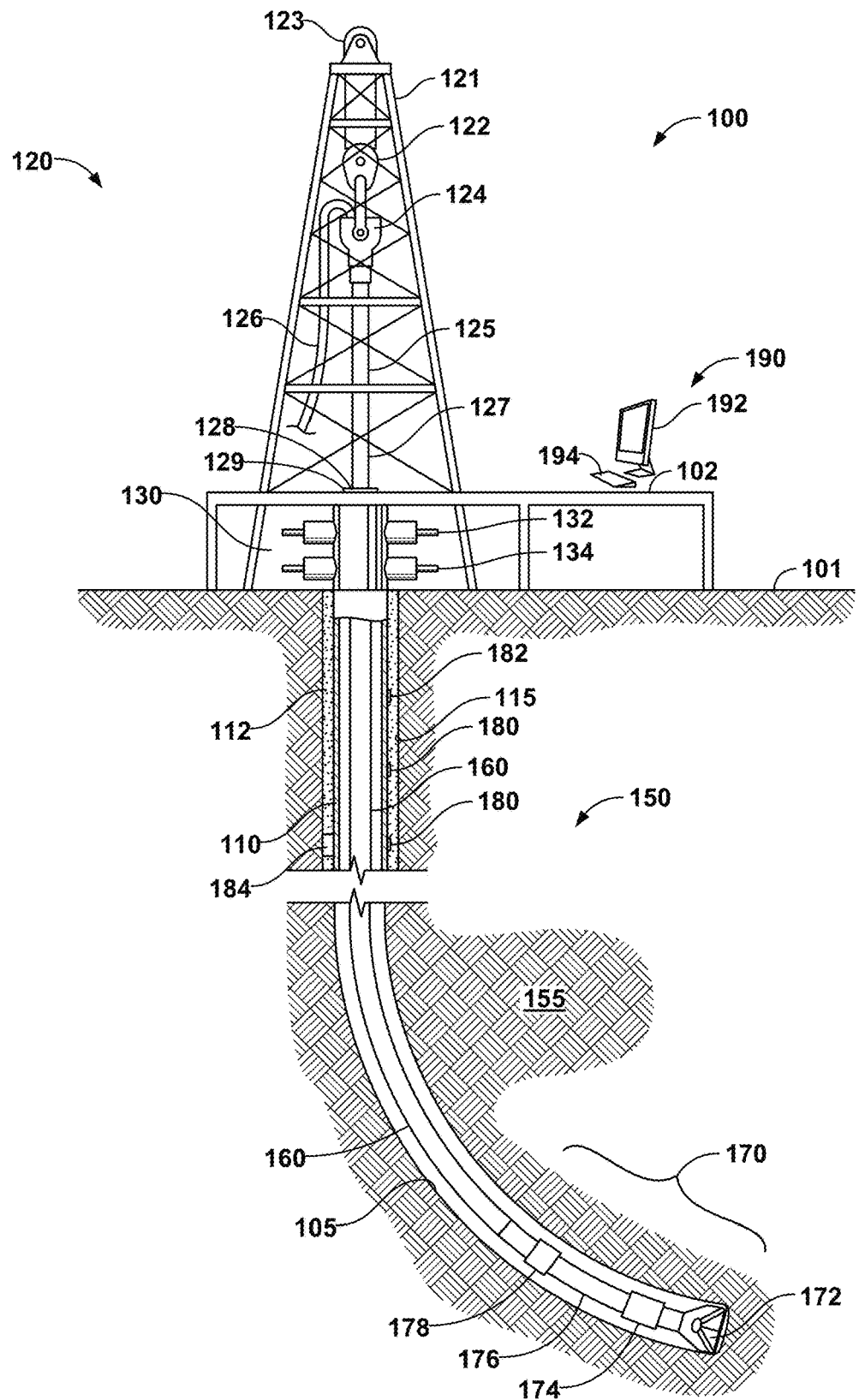
FIG. 1 presents a side, cross-sectional view of an illustrative, nonexclusive example of a wellbore, according to the present disclosure.

The Figures and accompanying description depict and describe various aspects of the disclosure. Elements that serve a similar, or at least substantially similar, purpose are labeled with like numbers in each of the Figures, and these elements may not be discussed in detail herein with reference to each of the Figures. Similarly, all elements may not be labeled in each of the Figures, but reference numerals associated therewith may be used herein for consistency. Elements, components, and/or features that are discussed herein with reference to one or more of the Figures may be included in and/or used with any of the Figures without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct the acoustic wireless network and/or the nodes thereof to perform any suitable portion, or subset, of any of the methods disclosed herein. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

If any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

Terminology

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in series, and/or at substantially different points in time. In some examples, methods may be implemented as processor executable instructions. Thus, a machine-readable medium may store processor executable instructions that if executed by a machine (e.g., processor) cause the machine to perform a method.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, the term "potting" refers to the encapsulation of electrical components with epoxy, elastomeric, silicone, or asphaltic or similar compounds for the purpose of excluding moisture or vapors. Potted components may or may not be hermetically sealed.

As used herein, the term "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, the term "sensor" includes any sensing device or gauge. The sensor may be capable of monitoring or detecting pressure, temperature, fluid flow, vibration, resistivity, or other formation data. Alternatively, the sensor may be a position sensor. The term "sensor" may also include devices or gauges that do more than passively sense or monitor a desired condition; such non-passive devices, termed herein as tools, are included in the general concept of a sensor as described herein.

As used herein, the term "subsurface" refers to geologic strata occurring below the earth's surface.

The terms "tubular member" or "tubular body" refer to any pipe, such as a joint of casing, a portion of a liner, a drill string, a production tubing, an injection tubing, a pup joint, a buried pipeline, underwater piping, or above-ground piping, solid lines therein, and any suitable number of such structures and/or features may be omitted from a given embodiment without departing from the scope of the present disclosure.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

The terms "zone" or "zone of interest" refer to a portion of a subsurface formation containing hydrocarbons. The term "hydrocarbon-bearing formation" may alternatively be used.

DESCRIPTION

Specific forms will now be described further by way of example. While the following examples demonstrate certain forms of the subject matter disclosed herein, they are not to be interpreted as limiting the scope thereof, but rather as contributing to a complete description.

FIG. 1 is a side, cross-sectional view of an illustrative well site 100. The well site 100 includes a derrick 120 at an earth surface 101. The well site 100 also includes a wellbore 150 extending from the earth surface 101 and down into an earth subsurface 155. The wellbore 150 is being formed using the derrick 120, a drill string 160 below the derrick 120, and a bottom hole assembly 170 at a lower end of the drill string 160.

Referring first to the derrick 120, the derrick 120 includes a frame structure 121 that extends up from the earth surface 101. The derrick 120 supports drilling equipment including a traveling block 122, a crown block 123 and a swivel 124. A so-called kelly 125 is attached to the swivel 124. The kelly 125 has a longitudinally extending bore (not shown) in fluid communication with a kelly hose 126. The kelly hose 126, also known as a mud hose, is a flexible, steel-reinforced, high-pressure hose that delivers drilling fluid through the bore of the kelly 125 and down into the drill string 160.

The kelly 125 includes a drive section 127. The drive section 127 is non-circular in cross-section and conforms to an opening 128 longitudinally extending through a kelly drive bushing 129. The kelly drive bushing 129 is part of a rotary table. The rotary table is a mechanically driven device that provides clockwise (as viewed from above) rotational force to the kelly 125 and connected drill string 160 to facilitate the process of drilling a borehole 105. Both linear and rotational movement may thus be imparted from the kelly 125 to the drill string 160.

A platform 102 is provided for the derrick 120. The platform 102 extends above the earth surface 101. The platform 102 generally supports rig hands along with various components of drilling equipment such as pumps, motors, gauges, a dope bucket, tongs, pipe lifting equipment and control equipment. The platform 102 also supports the rotary table.

It is understood that the platform 102 shown in FIG. 1 is somewhat schematic. It is also understood that the platform 102 is merely illustrative and that many designs for drilling rigs and platforms, both for onshore and for offshore operations, exist. These include, for example, top drive drilling systems. The claims provided herein are not limited by the configuration and features of the drilling rig unless expressly stated in the claims.

Placed below the platform 102 and the kelly drive section 127 but above the earth surface 101 is a blow-out preventer, or BOP 130. The BOP 130 is a large, specialized valve or set of valves used to control pressures during the drilling of oil and gas wells. Specifically, blowout preventers control the fluctuating pressures emanating from subterranean formations during a drilling process. The BOP 130 may include upper 132 and lower 134 rams used to isolate flow on the back side of the drill string 160. Blowout preventers 130 also prevent the pipe joints making up the drill string 160 and the drilling fluid from being blown out of the wellbore 150 in the event of a sudden pressure kick.

As shown in FIG. 1, the wellbore 150 is being formed down into the subsurface formation 155. In addition, the wellbore 150 is being shown as a deviated wellbore. Of course, this is merely illustrative as the wellbore 150 may be a vertical well or even a horizontal well, as shown later in FIG. 2.

In drilling the wellbore 150, a first string of casing 110 is placed down from the surface 101. This is known as surface casing 110 or, in some instances (particularly offshore), conductor pipe. The surface casing 110 is secured within the formation 155 by a cement sheath 112. The cement sheath 112 resides within an annular region 115 between the surface casing 110 and the surrounding formation 155.

During the process of drilling and completing the wellbore 150, additional strings of casing (not shown) will be provided. These may include intermediate casing strings and a final production casing string. For an intermediate case string or the final production casing, a liner may be employed, that is, a string of casing that is not tied back to the surface 101.

As noted, the wellbore 150 is formed by using a bottom hole assembly 170. The bottom-hole assembly 170 allows the operator to control or "steer" the direction or orientation of the wellbore 150 as it is formed. In this instance, the bottom hole assembly 170 is known as a rotary steerable drilling system, or RSS.

The bottom hole assembly 170 will include a drill bit 172. The drill bit 172 may be turned by rotating the drill string 160 from the platform 102. Alternatively, the drill bit 172 may be turned by using so-called mud motors 174. The mud motors 174 are mechanically coupled to and turn the nearby drill bit 172. The mud motors 174 are used with stabilizers or bent subs 176 to impart an angular deviation to the drill bit 172. This, in turn, deviates the well from its previous path in the desired azimuth and inclination.

There are several advantages to directional drilling. These primarily include the ability to complete a wellbore along a substantially horizontal axis of a subsurface formation, thereby exposing a greater formation face. These also include the ability to penetrate into subsurface formations that are not located directly below the wellhead. This is particularly beneficial where an oil reservoir is located under an urban area or under a large body of water. Another benefit of directional drilling is the ability to group multiple wellheads on a single platform, such as for offshore drilling. Finally, directional drilling enables multiple laterals and/or sidetracks to be drilled from a single wellbore in order to maximize reservoir exposure and recovery of hydrocarbons.

The illustrative well site 100 also includes a sensor 178. In some embodiments, the sensor 178 is part of the bottom hole assembly 170. The sensor 178 may be, for example, a set of position sensors that is part of the electronics for an RSS. Alternatively or in addition, the sensor 178 may be a temperature sensor, a pressure sensor, or other sensor for detecting a downhole condition during drilling. Alternatively still, the sensor may be an induction log or gamma ray log or other log that detects fluid and/or geology downhole.

The sensor 178 may be part of a MWD or a LWD assembly. It is observed that the sensor 178 is located above the mud motors 174. This is a common practice for MWD assemblies. This allows the electronic components of the sensor 178 to be spaced apart from the high vibration and centrifugal forces acting on the bit 172.

Where the sensor 178 is a set of position sensors, the sensors may include three inclinometer sensors and three environmental acceleration sensors. Ideally, a temperature sensor and a wear sensor will also be placed in the drill bit 172. These signals are input into a multiplexer and transmitted.

As the wellbore 150 is being formed, the operator may wish to evaluate the integrity of the cement sheath 112 placed around the surface casing 110 (or other casing string). To do this, the industry has relied upon so-called cement bond logs. As discussed above, a cement bond log (or CBL), uses an acoustic signal that is transmitted by a logging tool at the end of a wireline. The logging tool includes a transmitter, and one or more receivers that "listen" for sound waves generated by the transmitter through the surrounding casing string. The logging tool includes a signal processor that takes a continuous measurement of the amplitude of sound pulses from the transmitter to the receiver. Alternately, the attenuation of the sonic signal may be measured.

In some instances, a bond log will measure acoustic impedance of the material in the annulus directly behind the casing. This may be done through resonant frequency decay. Such logs include, for example, the USIT log of Schlumberger (of Sugar Land, Tex.) and the CAST-V log of Halliburton (of Houston, Tex.).

It is desirable to implement a downhole telemetry system that enables the operator to evaluate cement sheath integrity without need of running a CBL line. This enables the operator to check cement sheath integrity as soon as the cement has set in the annular region 115 or as soon as the wellbore 150 is completed. Additionally or alternatively, one or more sensors (not shown) may be deployed downhole to monitor a wide variety of properties, including, but not limited to, fluid characteristics, temperature, depth, etc., as those skilled in the art will plainly understand.

To do this, the well site 100 includes a plurality of battery-powered intermediate communications nodes 180. The battery-powered intermediate communications nodes 180 are placed along the outer surface 114 of the surface casing 110 according to a pre-designated spacing. The battery-powered intermediate communications nodes 180 are configured to receive and then relay acoustic signals along the length of the wellbore 150 in node-to-node arrangement up to the topside communications node 182. The topside communications node 182 is placed closest to the surface 101. The topside communications node 182 is configured to receive acoustic signals and convert them to electrical or optical signals. The topside communications node 182 may be above grade or below grade.

The nodes may also include a sensor communications node 184. The sensor communications node is placed closest to the sensor 178. The sensor communications node 184 is configured to communicate with the downhole sensor 178, and then send a wireless signal using an acoustic wave.

The well site 100 of FIG. 1 also shows a receiver 190. The receiver 190 comprises a processor 192 that receives signals sent from the topside communications node 182. The signals may be received through a wire (not shown) such as a co-axial cable, a fiber optic cable, a USB cable, or other electrical or optical communications wire. Alternatively, the receiver 190 may receive the final signals from the topside communications node 182 wirelessly through a modem, a transceiver or other wireless communications link such as Bluetooth or Wi-Fi. The receiver 190 preferably receives electrical signals via a so-called Class I, Division I conduit, that is, a housing for wiring that is considered acceptably safe in an explosive environment. In some applications, radio, infrared or microwave signals may be utilized.

The processor 192 may include discrete logic, any of various integrated circuit logic types, or a microprocessor. In any event, the processor 192 may be incorporated into a computer having a screen. The computer may have a separate keyboard 194, as is typical for a desk-top computer, or an integral keyboard as is typical for a laptop or a personal digital assistant. In one aspect, the processor 192 is part of a multi-purpose "smart phone" having specific "apps" and wireless connectivity.

As indicated, the intermediate communications nodes 180 of the downhole telemetry system are powered by batteries and, as such, system energy limitations can be encountered. While the useful life of the network can be extended by placing the nodes into a "sleep" mode when data collection and communication are not needed; heretofore, there have been no methods available to awaken the intermediate communications nodes 180 when data acquisition is required. Thus, prior to the systems and methods of the present disclosure, the downhole telemetry system was always in the active state; consequently, the life of the network was limited to months, not years.

As has been described hereinabove, FIG. 1 illustrates the use of a wireless data telemetry system during a drilling operation. As may be appreciated, the wireless telemetry system may also be employed after a well is completed. In any event, the wireless data telemetry system shown in the Figures and described herein may be described as having a substantially linear network topology because it generally follows the linear path of a drill string, casing string, wellbore, pipeline, or the like. Such a substantially linear network topology may include multiple drill strings, wellbores, or pipelines, or portions thereof (such as deviations or lateral sections of a wellbore) operationally connected at one or more points.

Figure 2:
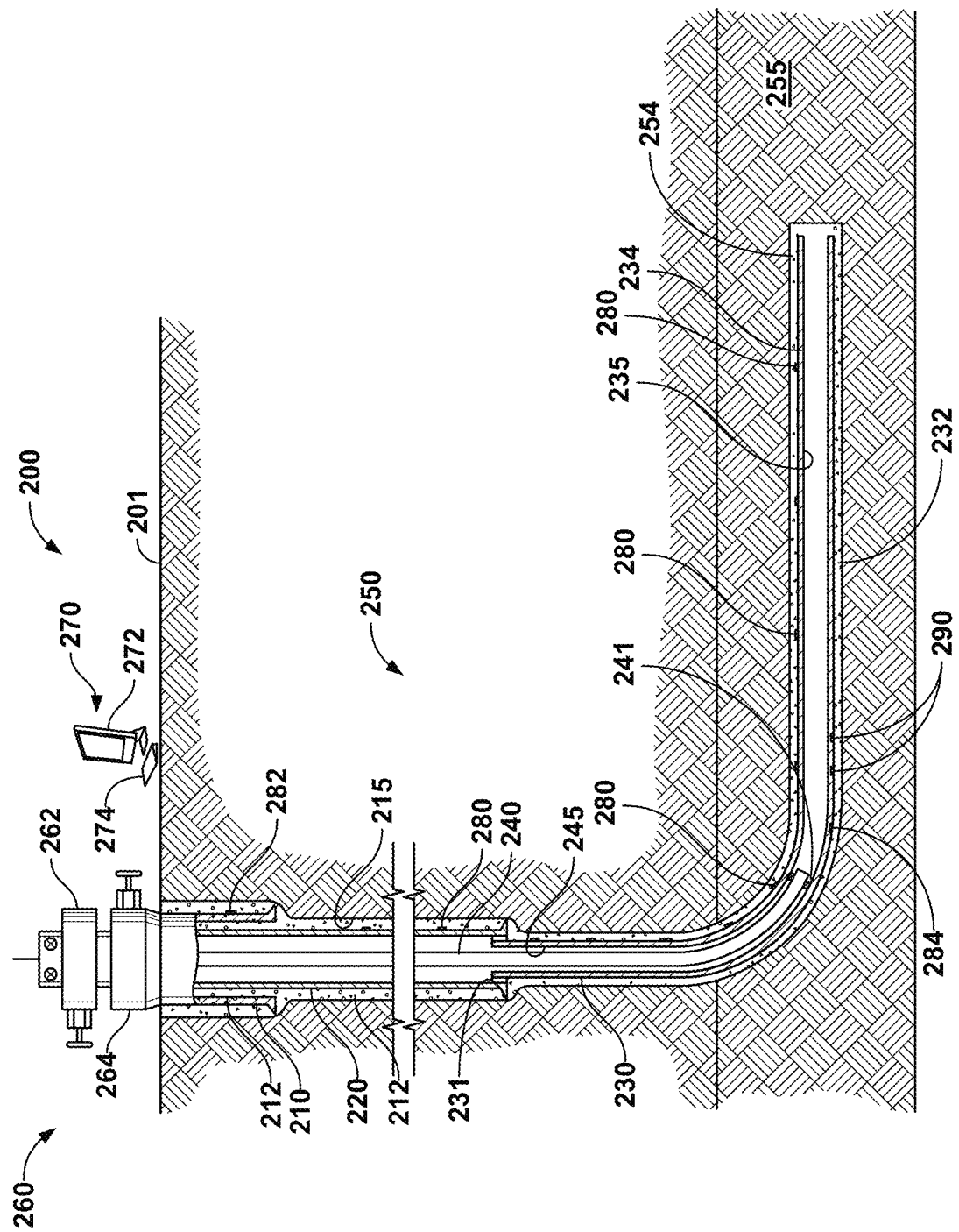
FIG. 2 presents a cross-sectional view of an illustrative, nonexclusive example of wellbore having been completed, according to the present disclosure.

FIG. 2 is a cross-sectional view of an illustrative well site 200. The well site 200 includes a wellbore 250 that penetrates into a subsurface formation 255. The wellbore 250 has been completed as a cased-hole completion for producing hydrocarbon fluids. The well site 200 also includes a well head 260. The well head 260 is positioned at an earth surface 201 to control and direct the flow of formation fluids from the subsurface formation 255 to the surface 201.

Referring first to the well head 260, the well head 260 may be any arrangement of pipes or valves that receive reservoir fluids at the top of the well. In the arrangement of FIG. 2, the well head 260 represents a so-called Christmas tree. A Christmas tree is typically used when the subsurface formation 255 has enough in situ pressure to drive production fluids from the formation 255, up the wellbore 250, and to the surface 201. The illustrative well head 260 includes a top valve 262 and a bottom valve 264.

It is understood that rather than using a Christmas tree, the well head 260 may alternatively include a motor (or prime mover) at the surface 201 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 260 may be configured to support a string of production tubing having a downhole electric submersible pump, a gas lift valve, or other means of artificial lift (not shown). The present inventions are not limited by the configuration of operating equipment at the surface unless expressly noted in the claims.

Referring next to the wellbore 250, the wellbore 250 has been completed with a series of pipe strings referred to as casing. First, a string of surface casing 210 has been cemented into the formation. Cement is shown in an annular bore 215 of the wellbore 250 around the casing 210. The cement is in the form of an annular sheath 212. The surface casing 210 has an upper end in sealed connection with the lower valve 264.

Next, at least one intermediate string of casing 220 is cemented into the wellbore 250. The intermediate string of casing 220 is in sealed fluid communication with the upper master valve 262. A cement sheath 212 is again shown in a bore 215 of the wellbore 250. The combination of the casing 210/220 and the cement sheath 212 in the bore 215 strengthens the wellbore 250 and facilitates the isolation of formations behind the casing 210/220.

It is understood that a wellbore 250 may, and typically will, include more than one string of intermediate casing. In some instances, an intermediate string of casing may be a liner.

Finally, a production string 230 is provided. The production string 230 is hung from the intermediate casing string 230 using a liner hanger 231. The production string 230 is a liner that is not tied back to the surface 201. In the arrangement of FIG. 2, a cement sheath 232 is provided around the liner 230.

The production liner 230 has a lower end 234 that extends to an end 254 of the wellbore 250. For this reason, the wellbore 250 is said to be completed as a cased-hole well. Those of ordinary skill in the art will understand that for production purposes, the liner 230 may be perforated after cementing to create fluid communication between a bore 235 of the liner 230 and the surrounding rock matrix making up the subsurface formation 255. In one aspect, the production string 230 is not a liner but is a casing string that extends back to the surface.

As an alternative, end 254 of the wellbore 250 may include joints of sand screen (not shown). The use of sand screens with gravel packs allows for greater fluid communication between the bore 235 of the liner 230 and the surrounding rock matrix while still providing support for the wellbore 250. In this instance, the wellbore 250 would include a slotted base pipe as part of the sand screen joints. Of course, the sand screen joints would not be cemented into place and would not include subsurface communications nodes.

The wellbore 250 optionally also includes a string of production tubing 240. The production tubing 240 extends from the well head 260 down to the subsurface formation 255. In the arrangement of FIG. 2, the production tubing 240 terminates proximate an upper end of the subsurface formation 255. A production packer 241 is provided at a lower end of the production tubing 240 to seal off an annular region 245 between the tubing 240 and the surrounding production liner 230. However, the production tubing 240 may extend closer to the end 234 of the liner 230.

In some completions a production tubing 240 is not employed. This may occur, for example, when a monobore is in place.

It is also noted that the bottom end 234 of the production string 230 is completed substantially horizontally within the subsurface formation 255. This is a common orientation for wells that are completed in so-called "tight" or "unconventional" formations. Horizontal completions not only dramatically increase exposure of the wellbore to the producing rock face, but also enables the operator to create fractures that are substantially transverse to the direction of the wellbore. Those of ordinary skill in the art may understand that a rock matrix will generally "part" in a direction that is perpendicular to the direction of least principal stress. For deeper wells, that direction is typically substantially vertical. However, the present inventions have equal utility in vertically completed wells or in multi-lateral deviated wells.

As with the well site 100 of FIG. 1, the well site 200 of FIG. 2 includes a telemetry system that utilizes a series of novel communications nodes. This again may be for the purpose of evaluating the integrity of the cement sheath 212, 232. The communications nodes are placed along the outer diameter of the casing strings 210, 220, 230. These nodes allow for the high speed transmission of wireless signals based on the in situ generation of acoustic waves.

The nodes first include a topside communications node 282. The topside communications node 282 is placed closest to the surface 201. The topside node 282 is configured to receive acoustic signals.

In some embodiments, the nodes may also include a sensor communications node 284. The sensor communications node 284 may be placed near one or more sensors 290. The sensor communications node 284 is configured to communicate with the one or more downhole sensors 290, and then send a wireless signal using acoustic waves.

The sensors 290 may be, for example, pressure sensors, flow meters, or temperature sensors. A pressure sensor may be, for example, a sapphire gauge or a quartz gauge. Sapphire gauges can be used as they are considered more rugged for the high-temperature downhole environment. Alternatively, the sensors may be microphones for detecting ambient noise, or geophones (such as a tri-axial geophone) for detecting the presence of micro-seismic activity. Alternatively still, the sensors may be fluid flow measurement devices such as a spinners, or fluid composition sensors.

In addition, the nodes include a plurality of subsurface battery-powered intermediate communications nodes 280. Each of the subsurface battery-powered intermediate communications nodes 280 is configured to receive and then relay acoustic signals along essentially the length of the wellbore 250. For example, the subsurface battery-powered intermediate communications nodes 280 can utilize two-way electro-acoustic transducers to receive and relay mechanical waves.

The subsurface battery-powered intermediate communications nodes 280 transmit signals as acoustic waves. The acoustic waves can be at a frequency of, for example, between about 50 kHz and 1 MHz. The signals are delivered up to the topside communications node 282 so that signals indicative of cement integrity are sent from node-to-node. A last subsurface battery-powered intermediate communications node 280 transmits the signals acoustically to the topside communications node 282. Communication may be between adjacent nodes or may skip nodes depending on node spacing or communication range. Preferably, communication is routed around nodes which are not functioning properly.

The well site 200 of FIG. 2 shows a receiver 270. The receiver 270 can comprise a processor 272 that receives signals sent from the topside communications node 282. The processor 272 may include discrete logic, any of various integrated circuit logic types, or a microprocessor. The receiver 270 may include a screen and a keyboard 274 (either as a keypad or as part of a touch screen). The receiver 270 may also be an embedded controller with neither a screen nor a keyboard which communicates with a remote computer such as via wireless, cellular modem, or telephone lines.

The signals may be received by the processor 272 through a wire (not shown) such as a co-axial cable, a fiber optic cable, a USB cable, or other electrical or optical communications wire. Alternatively, the receiver 270 may receive the final signals from the topside node 282 wirelessly through a modem or transceiver. The receiver 270 can receive electrical signals via a so-called Class I, Div. 1 conduit, that is, a wiring system or circuitry that is considered acceptably safe in an explosive environment.

FIGS. 1 and 2 present illustrative wellbores 150, 250 that may receive a downhole telemetry system using acoustic transducers. In each of FIGS. 1 and 2, the top of the drawing page is intended to be toward the surface and the bottom of the drawing page toward the well bottom. While wells commonly are completed in substantially vertical orientation, it is understood that wells may also be inclined and even horizontally completed. When the descriptive terms "up" and "down" or "upper" and "lower" or similar terms are used in reference to a drawing, they are intended to indicate location on the drawing page, and not necessarily orientation in the ground, as the present inventions have utility no matter how the wellbore is orientated.

In each of FIGS. 1 and 2, the battery-powered intermediate communications nodes 180, 280 are specially designed to withstand the same corrosive and environmental conditions (for example, high temperature, high pressure) of a wellbore 150 or 250, as the casing strings, drill string, or production tubing. To do so, it is preferred that the battery-powered intermediate communications nodes 180, 280 include sealed steel housings for holding the electronics. In one aspect, the steel material is a corrosion resistant alloy.

Figure 3:
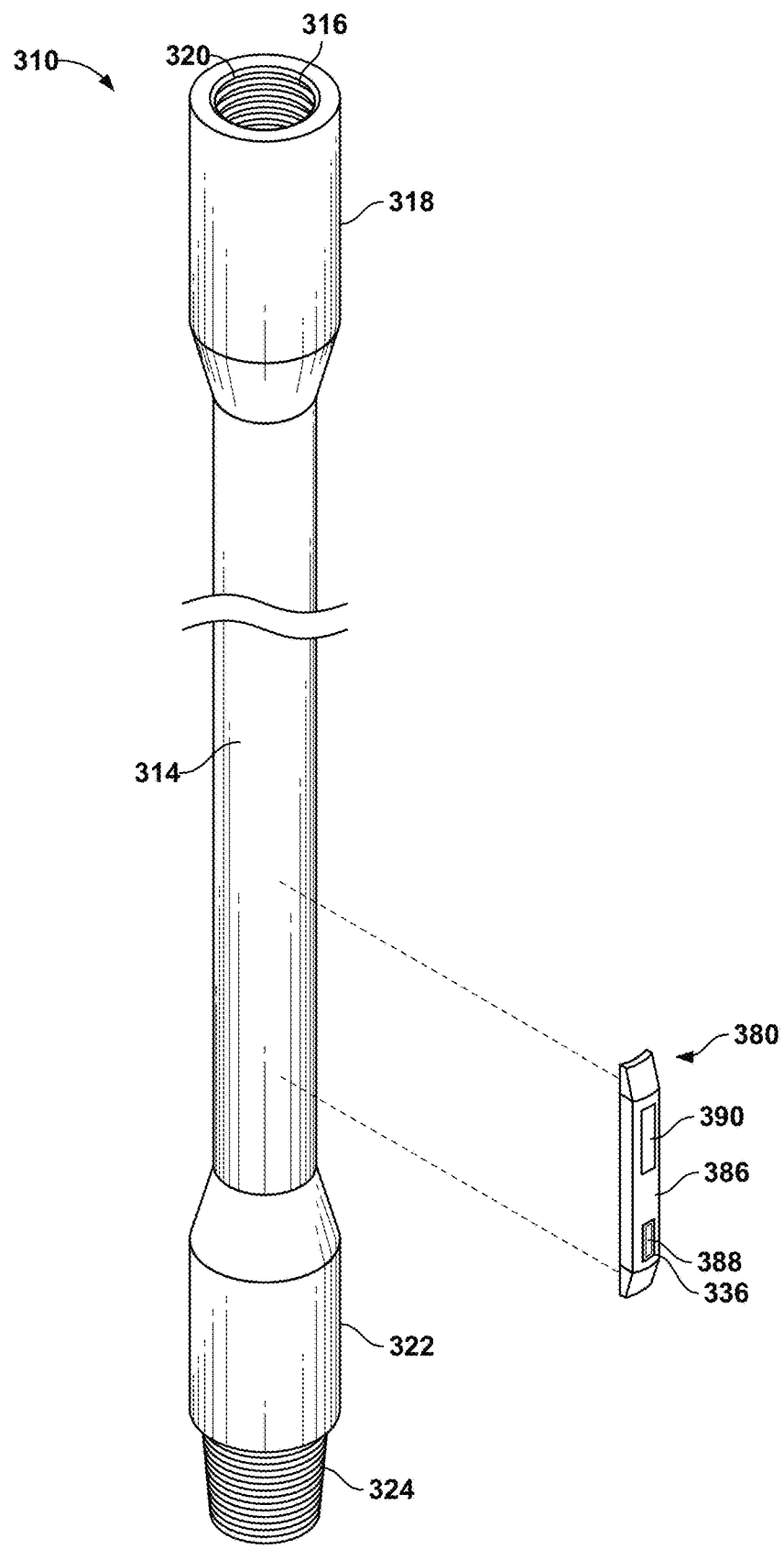
FIG. 3 presents a perspective view of an illustrative tubular section of a downhole wireless telemetry system according to aspects of the disclosure.

Referring now to FIG. 3, an enlarged perspective view of an illustrative tubular section 310 of a tubular body, along with an illustrative intermediate communications node 380 is shown. The illustrative intermediate communications node 380 is shown exploded away from the tubular section 310. The tubular section 310 has an elongated wall 314 defining an internal bore 316. The tubular section 310 has a box end 318 having internal threads 320, and a pin end 322 having external threads 324.

As noted, the illustrative intermediate communications node 380 is shown exploded away from the tubular section 310. The intermediate communications node 380 is structured and arranged to attach to the wall 314 of the tubular section 310 at a selected location. In one aspect, selected tubular sections 310 will each have an intermediate communications node 380 between the box end 318 and the pin end 322. In one arrangement, the intermediate communications node 380 is placed immediately adjacent the box end 318 or, alternatively, immediately adjacent the pin end 322 of every tubular section 310. In another arrangement, the intermediate communications node 380 is placed at a selected location along every second or every third tubular section 310. In other aspects, more or less than one intermediate communications node 380 may be placed per tubular section 310.

In some embodiments, the intermediate communications node 380 shown in FIG. 3 is designed to be pre-welded onto the wall 314 of the tubular section 310. In some embodiments, intermediate communications node 380 is configured to be selectively attachable to/detachable from an intermediate by mechanical means at a well 100, 200 (see FIGS. 1-2). This may be done, for example, through the use of clamps (not shown). Alternatively, an epoxy or other suitable acoustic couplant may be used for chemical bonding. In any instance, the intermediate communications node 310 is an independent wireless communications device that is designed to be attached to an external surface of a tubular.

There are benefits to the use of an externally-placed communications node that uses acoustic waves. For example, such a node will not interfere with the flow of fluids within the internal bore 316 of the tubular section 310. Further, installation and mechanical attachment can be readily assessed or adjusted, as necessary.

As shown in FIG. 3, the intermediate communications node 380 includes a housing 386. The housing 386 supports a power source residing within the housing 386, which may be one or more batteries, as shown schematically at 390. The housing 386 also supports a first electro-acoustic transducer, configured to serve as a receiver of acoustic signals and shown schematically at 388, a second electro-acoustic transducer, configured to serve as a transmitter of acoustic signals and shown schematically at 336.

The intermediate communications node 380 is intended to represent the plurality of intermediate communications nodes 180 of FIG. 1, in one embodiment, and the plurality of intermediate communications nodes 280 of FIG. 2, in another embodiment. The first and second electro-acoustic transducers 388 and 336 in each intermediate communications node 380 allow acoustic signals to be sent from node-to-node, either up the wellbore or down the wellbore. Where the tubular section 310 is formed of carbon steel, such as a casing or liner, the housing 386 may be fabricated from carbon steel. This metallurgical match avoids galvanic corrosion at the coupling.

Figure 4:
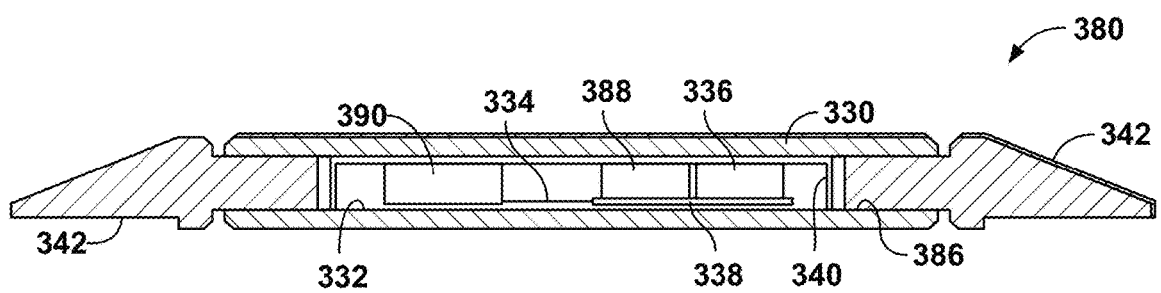
FIG. 4 presents a cross-sectional view of the intermediate communications node of FIG. 3.

FIG. 4 provides a cross-sectional view of the intermediate communications node 380 of FIG. 3. The view is taken along the longitudinal axis of the intermediate communications node 380. The housing 386 is dimensioned to be strong enough to protect internal components and other electronics disposed within the interior region. In one aspect, the housing 386 has an outer wall 330 that may be about 0.2 inches (0.51 cm) in thickness. A cavity 332 houses the electronics, including, by way of example and not of limitation, a power source 390 such as a battery, a power harvesting device, or the like, a power supply wire 334, a first electro-acoustic transducer 388, a second electro-acoustic transducer 336, and a circuit board 338. The circuit board 338 will preferably include a micro-processor or electronics module that processes acoustic signals. The first electro-acoustic transducer 388, and the second electro-acoustic transducer 336 are provided to convert acoustical energy to electrical energy (or vice-versa) and are coupled with outer wall 330 on the side attached to the tubular body.

In some embodiments, the second electro-acoustic transducer 336, configured to serve as a transmitter, of intermediate communications nodes 380 may also produce acoustic telemetry signals. In some embodiments, an electrical signal is delivered to the second electro-acoustic transducer 336, such as through a driver circuit. In some embodiments, the acoustic waves represent asynchronous packets of information comprising a plurality of separate tones.

In some embodiments, the acoustic telemetry data transfer is accomplished using multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, a band pass filter.

The signal generated by the second electro-acoustic transducer 336 then passes through the housing 386 to the tubular body 310, and propagates along the tubular body 310 to other intermediate communications nodes 380. In one aspect, the acoustic signal is generated (first electro-acoustic transducer 388) and/or received (second electro-acoustic transducer 336) by a magnetostrictive transducer comprising a coil wrapped around a core. In another aspect, the acoustic signal is generated and/or received by a piezoelectric ceramic transducer. In either case, the electrically encoded data are transformed into a sonic wave that is carried through the wall 314 of the tubular body 310 in the wellbore. In certain configurations, a single transducer may serve as both the transmitter and receiver.

In some embodiments, the internals of intermediate communications nodes 380 may also be provided with a protective layer 340. The protective layer 340 resides internal to the wall 330 and provides an additional thin layer of protection for the electronics. This protective layer provides additional mechanical durability and moisture isolation. The intermediate communications nodes 380 may also be fluid sealed with the housing 386 to protect the internal electronics. One form of protection for the internal electronics is available using a potting material.

In some embodiments, the intermediate communications nodes 380 may also optionally include a shoe 342. More specifically, the intermediate communications nodes 380 may include a pair of shoes 342 disposed at opposing ends of the wall 330. Each of the shoes 342 provides a beveled face that helps prevent the node 380 from hanging up on an external tubular body or the surrounding earth formation, as the case may be, during run-in or pull-out.

Figure 5:
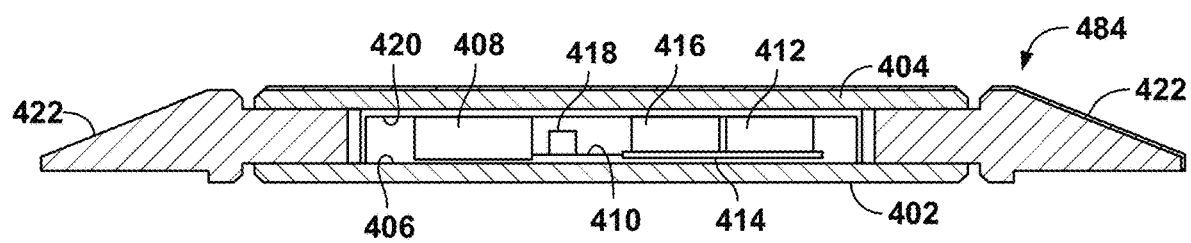
FIG. 5 is a cross-sectional view of an illustrative embodiment of a sensor communications node according to the present disclosure.

FIG. 5 provides a cross-sectional view of a sensor communications node 484. The sensor communications node 484 is intended to represent the sensor communications node 184 of FIG. 1, in one embodiment, and the sensor communications nodes 284 of FIG. 2, in another embodiment. The view is taken along the longitudinal axis of the sensor communications node 484. The sensor communications node 484 includes a housing 402. The housing 402 is structured and arranged to be attached to an outer wall of a tubular section, such as the tubular section 310 of FIG. 3. Where the tubular section is formed of a carbon steel, such as a casing or liner, the housing 402 is preferably fabricated from carbon steel. This metallurgical match avoids galvanic corrosion at the coupling.

The housing 402 is dimensioned to be strong enough to protect internal components and other electronics disposed within the interior region. In one aspect, the housing 402 has an outer wall 404 that may be about 0.2 inches (0.51 cm) in thickness. An optional pair of shoes 422 may be disposed at opposing ends of the wall 404. Each of the shoes 422 may be shaped to provide a beveled face to help prevent the sensor communications node 484 from hanging up on an external tubular body or the surrounding earth formation, as the case may be, during run-in or pull-out. A cavity 406 houses the electronics, including, by way of example and not of limitation, a power source 408, a power supply wire 410, and a circuit board 414. The circuit board 414 will preferably include a micro-processor or electronics module that processes acoustic signals. A first electro-acoustic transducer 416 and a second electro-acoustic transducer 412 are provided to convert acoustical energy to electrical energy (or vice-versa) and are coupled with outer wall 404 on the side attached to the tubular body. The first electro-acoustic transducer 416 is in electrical communication with at least one sensor 418, possibly through a shared connection to a micro-processor on circuit board 414, which may be the at least one sensor 178 of FIG. 1, in one embodiment. It is noted that in FIG. 5, at least one sensor 418 resides within the housing 402 of the sensor communications node 484. In certain configurations, a single transducer may serve as both the transmitter and receiver. A protective layer 420 resides internal to the wall 404 and provides an additional thin layer of protection for the electronics. This protective layer provides additional mechanical durability and moisture isolation.

Figure 6:
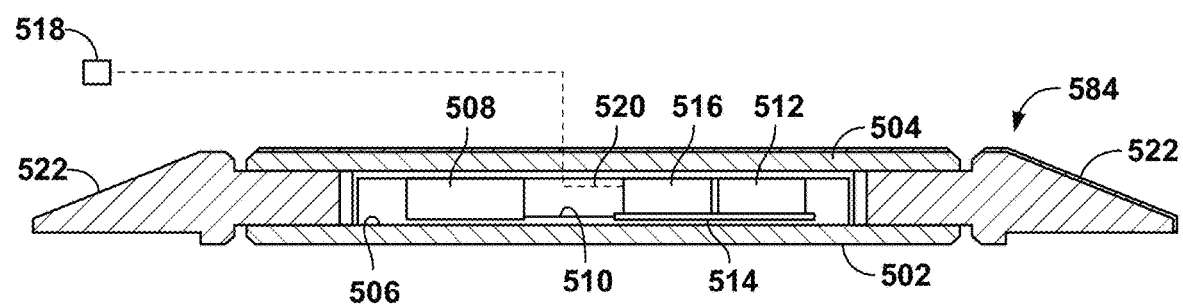
FIG. 6 is another cross-sectional view of an illustrative embodiment of a sensor communications node having a sensor positioned along the wellbore external to the sensor communications node, according to the present disclosure.

Referring now to FIG. 6, an alternate embodiment is presented wherein an at least one sensor 518 is shown to reside external to a sensor communications node 584, such as above or below the sensor communications node 584 along the wellbore. In FIG. 6, the sensor communications node 584 is also intended to represent the sensor communications node 184 of FIG. 1, in one embodiment, and the sensor communications nodes 284 of FIG. 2, in another embodiment. The sensor communications node 584 includes a housing 502, which is structured and arranged to be attached to an outer wall of a tubular section, such as the tubular section 310 of FIG. 3.

In one aspect, the housing 502 has an outer wall 504 that may be about 0.2 inches (0.51 cm) in thickness. An optional pair of beveled shoes 522 may be disposed at opposing ends of the wall 504 as described in previous embodiments. A cavity 506, lined with a protective layer 520, houses the electronics, including, by way of example and not of limitation, a power source 508, a power supply wire 510, and a circuit board 514. The circuit board 514 will preferably include a micro-processor or electronics module that processes acoustic signals. A first electro-acoustic transducer 516 and a second electro-acoustic transducer 512 are provided to convert acoustical energy to electrical energy (or vice-versa) and are coupled with outer wall 504 on the side attached to the tubular body. The electro-acoustic transducer 516 is in electrical communication with at least one sensor 518. A dashed line is provided showing an extended connection between the at least one sensor 518 and the electro-acoustic transducer 516. In certain configurations, a single transducer may serve as both the transmitter and receiver.

In operation, the sensor communications node 584 is in electrical communication with the (one or more) sensors. This may be by means of a wire, or by means of wireless communication such as infrared or radio waves, or by other means as disclosed herein. The sensor communications node 584 is configured to receive signals from the sensors.

The sensor communications node 584 transmits signals from the sensors as acoustic waves. The acoustic waves can be at a frequency band of about 50 kHz and 1 MHz, from about 50 kHz to about 500 kHz, from about 60 kHz to about 200 kHz, from about 65 kHz to about 175 kHz, from about 70 kHz to about 300 kHz, from about 75 kHz to about 150 kHz, from about 80 kHz to about 140 kHz, from about 85 kHz to about 135 kHz, from about 90 kHz to about 130 kHz, or from about 100 kHz to about 125 kHz, or about 100 kHz. The signals are received by an intermediate communications node, such as intermediate communications node 380 of FIG. 4. That intermediate communications node 380, in turn, will relay the signal on to another intermediate communications node so that acoustic waves indicative of the downhole condition are sent from node-to-node. A last intermediate communications node 380 transmits the signals to the topside node, such as topside node 182 of FIG. 1, or topside node 282 of FIG. 2.

The acoustic wireless network and/or the nodes thereof, which are disclosed herein, may include and/or be any suitable structure, device, and/or devices that may be adapted, configured, designed, constructed, and/or programmed to perform the functions discussed herein with reference to any of the methods disclosed herein. As examples, the acoustic wireless network and/or the associated nodes may include one or more of an electronic controller, a dedicated controller, a special-purpose controller, a special-purpose computer, a display device, a logic device, a memory device, and/or a memory device having computer-readable storage media.

Further aspects of the disclosure relating to the sensors usable in with an acoustic wireless network include: (1) a variety of hardware interfacing methods with sensors and downhole tools; (2) sensing concepts that are enabled by the unique interfaces; (3) physical implementation of the integrated sensor/communication node structures; and (4) related software communication protocols. The interfaces may support both data communication and power transfer.

1. Hardware Interfacing Methods

Figure 7:
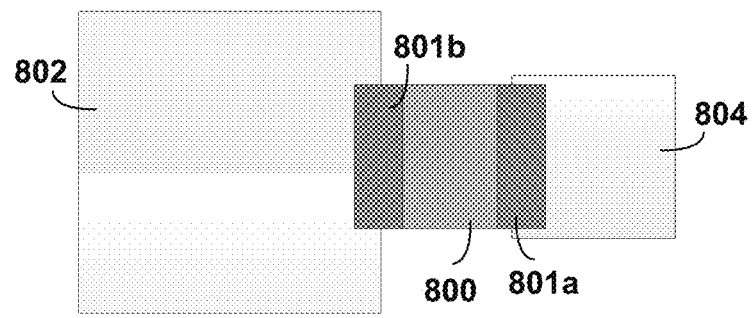
FIG. 7 is a schematic diagram of an interface between a sensor and a communication node according to aspects of the disclosure.

The interface enables an open architecture of the DWN communication nodes, as shown in FIG. 7. Included in the communicating interface possibilities are physical connectors, optical windows, and acoustic or electromagnetic wireless communication methods, which are collectively shown at 800. The communication interface also includes transmitters and/or receivers 801a, 801b. Both communication nodes 802 and individual sensors/tools 804 are instrumented accordingly in this interface. In addition, software protocols may be implemented to control one communication node to work with one or multiple sensors/tools, or one sensor/tool to work with multiple nodes. As previously defined, discussion of sensors herein include tools as well. As used herein, the term "device" generally includes any object capable of one-way or two-way communication with the disclosed communication network. The devices may include one or more communication nodes 802 configured to transmit and receive messages to other devices. The devices may also include one or more sensors 804 that transmit and/or receive messages to other devices. The devices may also include one or more tools that can transmit and/or receive messages to other devices. The tools may be any type of downhole tool or wellsite tool that performs a function related to hydrocarbon operations.

Physical connectors may be a mechanical or electric feed through, which is a physical structure directly embedded inside the communication node housing wall and the sensor body. For example, a mechanical plug may be a mechanical screw or connector. The screw or connector may be connected to a pressure sensor, electrodes for conductivity sensor, pH sensor etc. An electric plug may be a high temperature and/or high pressure plug for communication and power to/from the sensor node; on the other hand, the sensor node may also require a high temperature and/or a high pressure matching electric plug. For those sensors that are already embedded in the communication node, such as a pressure sensor, conductivity sensor or pH meter, or the like, the physical connector may also be a mechanical structure or channel to expose the sensor to the outside environment.

Another interface option is an optical window or optical fiber pigtail to the communication housing wall and sensor body. They can be used for both communication and power transfer if needed. A pressure boundary may be needed surrounding the optical window or fiber for both communication node and sensor.

An acoustic method is a non-intrusive interface between the communication node and sensor. Both the communication node and sensor should have acoustic communication capability, i.e. sending and receiving acoustic signals. The acoustic frequency used for this interface may be selected according to the system requirements, such as communication distance, data rates, etc. One communication node itself may be converted into a sensor directly, or acoustic communication capability is added to commercial sensors, including both hardware modification and software protocol. There is no penetration for wire feed through in this interface, and therefore the acoustic interface method is highly desirable to survive down hole conditions.

An electromagnetic wireless communication method is another non-intrusive interface. Due to the Faraday casing effect on electric field from a metal housing, magnetic field induction may be used for non-ferromagnetic metal wall power transfer and data communication through the non-ferromagnetic metal wall. Exemplary technologies include Hall effect, magnetoresistance, magnetic resonance methods, and the like. Just like a piezoelectric element is required for acoustic communication, a small coil of conductive wire is required to be provided inside the communication housing and sensor body to enable magnetic wireless communication. If the conductive wall of the node and sensor is insulated from ground, an electric capacitive method for wireless communication is also possible. In this case, capacitive electrodes are needed inside communication the housing and the sensor body.

According to disclosed aspect, the various types of communicating interfaces may be used to advantageously communicate in a wellbore using a plurality of communicating devices. The devices transmit and/or receive messages to or from other devices using one or more communicating interfaces. The messages may include data, which is broadly defined as any instruction or information. Alternatively, the messages may include power that can be delivered to batteries in nodes, sensors, or tools. The power may be transmitted and received, for example, using known methods. Each communicating interface includes a transmitter and/or receiver associated with each device, and a communicating medium through which messages are transmitted and/or received by the device. For example, an acoustic communicating interface may comprise a piezoelectric transmitter embedded in a device, and the communicating medium may comprise a wellbore tubular, the contents of the tubular, the geologic formation surrounding the tubular, the sensor housing, the housing of a communication node to which the sensor is sending messages, or other media known for propagating acoustic signals. A wired communicating interface may include a transmitter and/or receiver connected via a conductive wire to another device. A wireless communicating interface may include a wireless transmitter and/or receiver in a device, and the communicating medium may include any medium conducive to propagating electromagnetic signals of a desired electromagnetic frequency. An optical communicating interface may use optical transmitters/receivers, and the optical communicating medium may include a fiber, substantially unobstructed space between two devices, transparent and/or translucent openings in one device to permit an optical signal to travel to another device, and the like.

According to disclosed aspects, the way each device communicates with other devices may be modified based on ascertainable attributes of each device. Such attributes may include, but are not limited to: a type of data in one or more messages to be communicated (i.e., transmitted or received); a size of the messages to be communicated; a power consumption requirement to communicate one or more messages; a battery state of a battery associated with a device; and a type of communicating interface (i.e., wireless, wired, acoustic, optical etc.) available to communicate the message. Using this type of information, it is determined which communicating interface is best to transmit and receive messages to or from another device. A rate of communicating may also be determined using the device attributes.

The disclosed aspects are especially useful when a device has access to more one communicating interfaces, such as a wireless acoustic interface and an optical interface. Changes in device attributes permit the device to decide what is the most effective or optimal method to transmit and/or receive messages from other devices. For example, if a wireless acoustic interface is currently in use and is determined to be in a failure state because of, for example, a broken acoustic transmitter or a change in the efficacy of the acoustic communicating medium, the device may use the optical interface instead. The device may communicate to one or more of the other devices in the network that an optical communicating interface must be used when communicating with said device. Such change may necessitate a different communicating rate (i.e., bits per second), and depending on other device attributes. a changed communicating rate may also be messaged to the other devices. Such changed communicating rate may be higher or lower than the previous communicating rate.

The decision to transmit and/or receive messages using a new communicating interface and/or communicating rate, or maintain the use of a currently running interface and rate, may depend on the available power to transmit and/or receive messages from a device. When the device includes a power source such as a battery, the disclosed aspects may select the communicating interface and rate to maximize an effective life of the power source. Alternatively or additionally, the communicating rate may be adjusted based on available power.

2. Sensing Concepts

Innovative sensing concepts become feasible once existing sensors/tools are modified and integrated with the downhole wireless communication node. The sensing concepts may be powered by various communication methods, especially wireless communication methods through the metal wall of a pipeline or wellbore. Depending on the communication method between the communication node and sensor, modifications of commercial sensors/tools can be made accordingly. The communication node shape and dimensions should be considered for the interface design and implementation. Non-limiting examples are provided herein. Generally, simple and direct measurement resulting from the integration of sensors/tools and communication node is always a preferred way of sensing.

Figure 8:
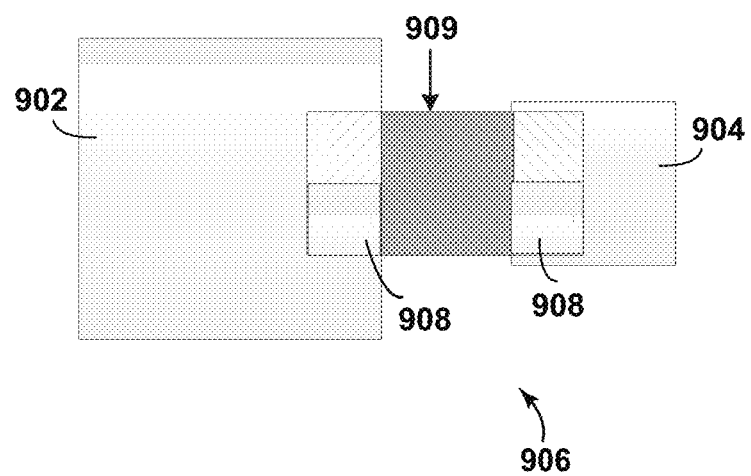
FIG. 8 is a schematic diagram of an interface between a sensor and a communication node according to aspects of the disclosure.

For acoustic wireless communication, acoustic communication built-in sensors/tools, as shown in FIG. 8, include a communication node 902, a sensor 904, and an acoustic interface 906 which includes acoustic transmitters and/or receivers 908. Sensor measurement results, (e.g. conductivity, acoustics and chemical) or control comments are communicated to a communications node through an acoustic medium 909. Aspects of these sensors may include: electric conductivity for oil/water differentiation; active/passive acoustic sensors for triangulating location of an event/ monitoring cement quality/flows/etc., and chemical sensors for composition or addition of chemicals for well conditioning, which may or may not be a sensing activity necessarily.

For magnetic wireless communication, magnetic field generation/measurement capabilities are built in to the communication node and the sensors/tools. One example is that the sensor may be magnetized, and the communication node may include a magnetic field detector, such as a coil. Sensor measurement results or control comments from a communications node are communicated through the magnetic communications channel. Since a magnetic field can penetrate deeper in metals with low magnetic permeability and low electric conductivity, if needed, the material may be selected for a section of casing or pipe to enhance communication between sensors and communication nodes, e.g. non-ferromagnetic metals.

Figure 9:
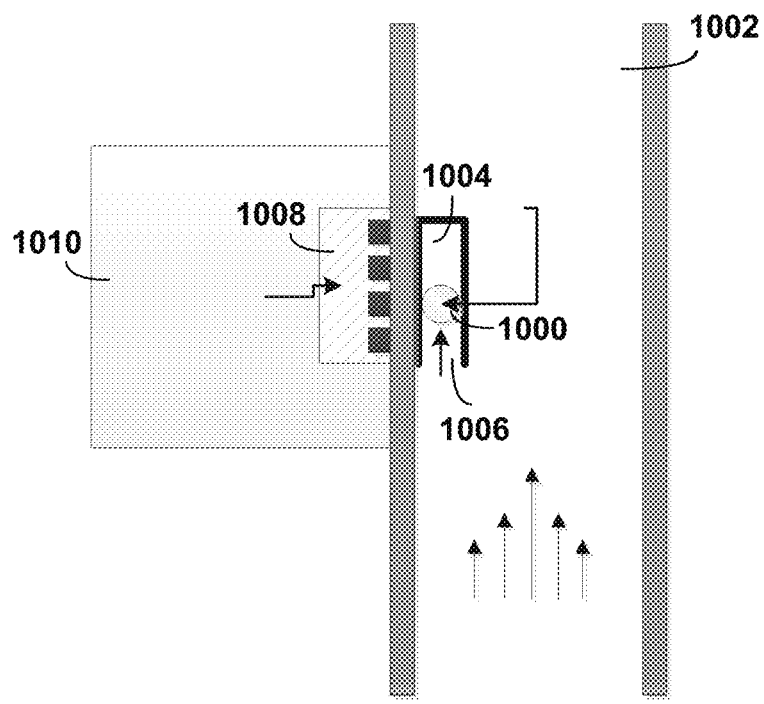
FIG. 9 is a schematic diagram of a sensor according to aspects of the disclosure.

One example of magnetic wireless communication is displacement sensing for pressure measurement, as shown in FIG. 9. To measure local pressure inside a pipe or casing 1002, a magnetized ball 1000 is inserted in a one-end sealed small tube 1004. The open end 1006 of the tube is exposed to the surrounding pressure, thus the location of the ball is an indicator of the pressure. To read out the location of the ball, multiple Hall Effect sensors 1008 or magnetoresistive sensors may be used inside the communication node or sensor 1010 along its length.

Figure 10:
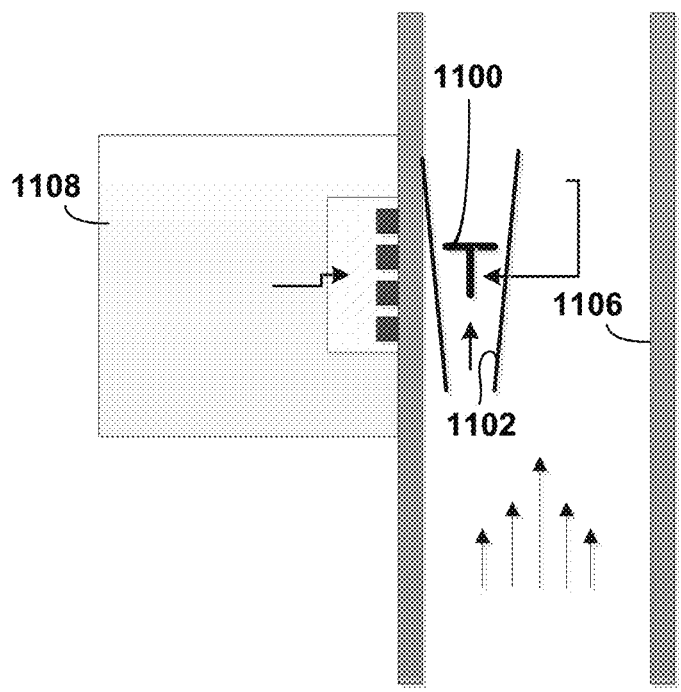
FIG. 10 is a schematic diagram of a sensor according to further aspects of the disclosure.

Another example of magnetic wireless communication is a variable area flow meter, e.g.—rotameter, as shown in FIG. 10. The same principle applies as with the above displacement pressure sensor, but in this case it is actually a position sensor associated with a communication node or sensor 1108. The floating ball is now a plug, piston, flexing vane or flapper 1100 inside a rotameter tube 1102, and which could be magnetized. Its location may be related to the flow rate of the stream inside the pipe or casing 1106. The difference between pressure measurement above and flow measurement is that both ends of the tube are open in the rotameter. Various versions of a rotameter exist, e.g. tapered tube rotameter, or perforated cylinder piston flow meter, flexing vane, disk or flapper flow meter, and any of these versions may be used.

3. Node Communication

The disclosed aspects may enable a flexible and simple method of deploying a downhole communication network. Because multiple communicating interfaces are possible, sensors and/or tools may be more likely to be placed where they are most effective, and not constrained by the limitations the communicating interfaces place on sensor/tool location. In an aspect, the sensors/tools may be placed anywhere in a three-dimensional radius from one or more nodes, where the radius is defined by an effective communicating distance using one or more of the communicating interfaces. The sensors and/or tools may be placed in various locations within or near the wellbore, as the following list of non-limiting examples demonstrates: as part of the node package itself, either inserted inside the node housing or coupled to the ends of the housing via a gasket or threaded connection; attached to the interior or exterior of the same casing string that the communication node is attached to; floating in the same annulus as the communication node, i.e., embedded in cement or annular fluid within the annulus; attached to and/or inserted in the geologic formation, in the same or a different annulus as the node, or even in a reservoir; integrated physically into the wall of the casing itself; integrated physically into the coupling between two casing joints, so the communication node and sensor are together to form a sensor gasket for easy installation; attached to or floating in a different annulus, casing string, or downhole tool; physically inserted through a tubular through a gland-type insertion; above grade attached to a well head, blow-out preventer, or other hardware; on or near the drill bit during a drilling operation; or in other locations disclosed herein. The flexible use of multiple communicating interfaces allows sensors, tools, and communication nodes to form and maintain a communicating network under a variety of tool/sensor/node placement strategies.

4. Software Interfaces and Protocols

Software interfaces and protocols used with the above sensors may include or enable one or more features and attributes that provide an advantaged communicating network. The sensors may advertise available services and capabilities either on-demand or proactively. One or more of the nodes may advertise power availability, clock granularity, available communication/modulation schemes, and other pertinent information to each sensor or tool. Sensors and tools may provide duty cycle and clock information (speeds available, granularity, etc.), keeping in mind that the node may change sensor duty cycle, clock used, sensor precision, and the like, to maximize availability to the node while also minimizing energy use. The node and the sensor/ tool may establish cross-device direct memory access (DMA) in which the sensor/tool may directly deposit sensor readings or other data in a portion of the address space on the node without the need for intervention by the node CPU. In a preferred aspect, the communication node may also be in a reduced power state during DMA. The node may act as a proxy (pass-through) for one or more sensors/tools such that sensors/tools may appear to interact with more distant devices which the node can reach, but for which the sensor (due to limited energy reserve and/or transmission strength) could not reach directly. Sensors and tools may alert the node regarding operational events such as low power, sensor/tool malfunction, and the like. The communication node may synchronize multiple sensors/tools such that readings from each sensor/tool occur at the same instant. The node may apply a mathematical calculation or other data transformation to the combined data from such multiple sensors/tools, to thereby provide derived data not possible via individual sensors/tools. Sensors/tools may respond to a ping or instruction from a node, or the sensors/tools may be triggered to send data on an event basis. Sensor/tool communication to the node, if acoustic, may be at different frequency/timing parameters than the surrounding network of nodes.

INDUSTRIAL APPLICABILITY

The wells and methods disclosed herein are applicable to the acoustic wireless communication, to the hydrocarbon exploration, and/or to the hydrocarbon production industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of communicating in a wellbore, comprising:
providing a downhole communication network, the downhole communication network including a plurality of communicating devices;
each of the devices transmitting and/or receiving messages to or from another of the devices using more than one communicating interface, wherein the communicating interfaces comprise any combination of a physical-connector-based communicating interface, an optical communicating interface, an acoustic communicating interface, and an electromagnetic communicating interface, and wherein each of the communicating interfaces includes:
at least one of a transmitter and a receiver associated with the device, and
a communicating medium through which messages are transmitted and/or received by the device;
for one of the devices, determining one or more device attributes of the device, wherein the one or more device attributes comprise at least one of a power consumption requirement to communicate a message to or from the device, a power state of a power source associated with the device, communicating interfaces available to communicate the message to or from the device, or an efficacy of each communicating interface available for communicating the message to or from the device;
for said one of the devices, determining a change in any of the one or more device attributes;
based on the determined one or more devices attributes and the determined change in any of the one or more device attributes, selecting:
one of the communicating interfaces from the types of communicating interfaces available to communicate the message instead of another communicating interface from the types of communicating interfaces available to communicate the message, wherein the one of the communicating interfaces and the another communicating interface communicate using different hardware interfacing methods and/or software communication protocols, and
a communicating rate,
to transmit and/or receive messages to or from said one of the devices;
wherein the selecting occurs on demand in response to advertised services and capabilities of another device, or in conjunction with advertising services and capabilities proactively to other devices.

2. The method of claim 1, wherein determining the change in any of the one or more device attributes comprises determining a change in the efficacy of one of the communicating interfaces available for communicating the message to or from the device, wherein the one of the communicating interfaces comprises the communicating interface that is currently in use with the device, and wherein the change in the efficacy of the communicating interface comprises an indication of failure of the communicating interface, and wherein the selecting comprises selecting another one of the communicating interfaces to transmit and/or receive messages to or from the device.

3. The method of claim 2, wherein said another one of the communicating interfaces has a communicating rate different from a communicating rate associated with the communicating interface currently in use.

4. The method of claim 1, wherein determining the change in any of the one or more device attributes comprises determining a change in the power state of the power source associated with the device, and wherein the communicating interface and the communicating rate are selected to maximize an effective life of the power source.

5. The method of claim 4, wherein selecting the communicating rate comprises: adjusting the communicating rate based on the determined one or more devices attributes and the determined changes in any of the one or more device attributes.

6. The method of claim 1, wherein the messages comprise data.

7. The method of claim 1, wherein the messages comprise power, and further comprising:
with the power, charging the power source associated with at least one of the devices.

8. The method of claim 1, wherein the devices comprise one or more of:
a communication node configured to transmit and receive messages to and from at least one other device, a sensor configured to transmit and/or receive messages to/from at least one other device, and a tool configured to transmit and/or receive messages to/from at least one other device.

9. The method of claim 1, wherein the communicating medium comprises a wire connecting at least two of the plurality of communicating devices.

10. The method of claim 1, wherein one of the communicating interfaces comprises the acoustic communicating interface, and wherein the acoustic communicating interface comprises at least one of an acoustic transmitter and an acoustic receiver, and wherein the communicating medium is an acoustic medium, the at least one of an acoustic transmitter and an acoustic receiver configured to transmit and/or receive messages through the acoustic medium.

11. The method of claim 10, wherein the acoustic medium is at least one of a wellbore tubular, a geologic formation surrounding the wellbore, or fluids in the wellbore tubular or in the wellbore.

12. The method of claim 1, wherein one of the communicating interfaces comprises the optical communicating interface, and wherein the optical communicating interface comprises at least one of an optical transmitter and an optical receiver, and wherein the communicating medium is an optical medium, the at least one of an optical transmitter and an optical receiver configured to transmit and/or receive messages through the optical medium.

13. The method of claim 12, wherein the optical medium comprises an optical fiber.

14. The method of claim 1, wherein one of the communication interfaces comprises the electromagnetic communicating interface, and wherein the electromagnetic communicating interface comprises at least one of a wireless electromagnetic transmitter and a wireless electromagnetic receiver, the at least one of a wireless electromagnetic transmitter and a wireless electromagnetic receiver configured to transmit and/or receive messages therebetween.

15. The method of claim 1, wherein one of the communicating devices is a sensor, attached to an outer surface of a wellbore tubular, through detecting a position of a magnetized object in the wellbore tubular using a Hall sensor array.

16. The method of claim 15, wherein the magnetized object is a ball that moves upwardly in the wellbore tubular in response to upward fluid flow therein.

17. The method of claim 1, wherein one of the communicating devices is a pressure sensor secured to an outer surface of a wellbore tubular, and wherein one of the communicating interfaces used by the pressure sensor comprises the acoustic communicating interface, and the wherein the acoustic communicating interface comprises an acoustic transmitter and an acoustic communicating medium.

18. The method of claim 1, wherein one of the plurality of devices is a sensor deployed in the downhole communication network within a distance from another of the plurality of devices such that more than one communicating interface may be employed to transmit and/or receive messages therebetween.

19. A downhole communication network for use in a wellbore, comprising:
a plurality of communicating devices, each of the devices transmitting and/or receiving messages to or from another of the devices using more than one communicating interface, wherein the communicating interfaces comprise any combination of a physical-connector-based communicating interface, an optical communicating interface, an acoustic communicating interface, and an electromagnetic communicating interface;

each of the communicating interfaces includes at least one of a transmitter and a receiver associated with the device, wherein messages are thereby transmitted and/or received by the device through a communicating medium;

wherein each device is configured to:
determine one or more device attributes of the device, wherein the one or more device attributes comprise at least one of a power consumption requirement to communicate a message to or from the device, a power state of a power source associated with the device, communicating interfaces available to communicate the message to or from the device, or an efficacy of each communicating interface available for communicating the message to or from the device;

determine a change in any of the one or more device attributes; and based on the determined one or more devices attributes and the determined change in any of the one or more device attributes, select:
one of the communicating interfaces from the types of communicating interfaces available to communicate the message instead of another communicating interface from the types of communicating interfaces available to communicate the message, wherein the one of the communicating interfaces and the another communicating interface communicate using different hardware interfacing methods and/or software communication protocols, and a communicating rate, to transmit and/or receive messages to or from the device, wherein the selecting occurs on demand in response to advertised services and capabilities of another device, or in conjunction with advertising services and capabilities proactively to other devices.

20. The downhole communication network of claim 19, wherein the change in any of the one or more of the device attributes comprises a change in the efficacy of one of the communicating interfaces available for communicating the message to or from the device, wherein the one of the communicating interfaces comprises the communicating interface that is currently in use with the device, and wherein the change in the efficacy of the communicating interface comprises an indication of failure of the communicating interface, and wherein the device is configured to select another one of the communicating interfaces to transmit and/or receive messages to or from the device.

21. The downhole communication network of claim 19, wherein the one or more of the device attributes comprises a testing state of the device, and wherein the device is configured to transmit and/or receive messages to or from the device, using a first one of the communicating interfaces, at a communicating rate that simulates transmitting and/or receiving messages to or from the device using a second one of the communicating interfaces.

22. The downhole communication network of claim 19, wherein the change in any of the one or more device attributes comprises a change in the power state of the power source associated with the device, and wherein the device is configured to select the communicating interface and the communicating rate to maximize an effective life of the power source.

23. The downhole communication network of claim 19, wherein the device is configured to adjust the communicating rate based on the determined one or more devices attributes and the determined changes in any of the one or more device attributes for the device.

24. The downhole communication network of claim 19, wherein the messages comprise data.

25. The downhole communication network of claim 19, wherein the messages comprise power, and wherein the power source associated with at least one of the devices is configured to be charged by the power.

26. The downhole communication network of claim 19, wherein the devices comprise on or more of:
 a communication node configured to transmit and receive messages to and from at least one other device,
 a sensor configured to transmit and/or receive messages to/from at least one other device, and
 a tool configured to transmit and/or receive messages to/from at least one other device.

27. The downhole communication network of claim 19, wherein the communicating medium comprises a wire connecting at least two of the plurality of communicating devices.

28. The downhole communication network of claim 19, wherein one of the communicating interfaces comprises the acoustic communicating interface, and wherein the acoustic communicating interface comprises at least one of an acoustic transmitter and an acoustic receiver, and wherein the communicating medium is an acoustic medium, the at least one of an acoustic transmitter and an acoustic receiver configured to transmit and/or receive messages through the acoustic medium.

29. The downhole communication network of claim 28, wherein the acoustic medium is at least one of a wellbore tubular and a geologic formation surrounding the wellbore, or fluids in the wellbore tubular or in the wellbore.

30. The downhole communication network of claim 19, wherein one of the communicating interfaces comprises the optical communicating interface, and wherein the optical communicating interface comprises at least one of an optical transmitter and an optical receiver and wherein the communicating medium is an optical medium, the at least one of an optical transmitter and an optical receiver configured to transmit and/or receive messages through the optical medium.

31. The downhole communication network of claim 30, wherein the optical medium comprises an optical fiber.

32. The downhole communication network of claim 19, wherein one of the communication interfaces comprises the electromagnetic communicating interface, and wherein the electromagnetic communicating interface comprises at least one of a wireless electromagnetic transmitter and a wireless electromagnetic receiver, the at least one of a wireless electromagnetic transmitter and a wireless electromagnetic receiver configured to transmit and/or receive messages therebetween.

33. The downhole communication network of claim 19, wherein one of the communicating devices is a pressure sensor, attached to an outer surface of a wellbore tubular, through detecting a position of a magnetized object in the wellbore tubular using a Hall sensor array.

34. The downhole communication network of claim 33, wherein the magnetized object is a ball that moves upwardly in the wellbore tubular in response to upward fluid flow therein, for flow rate measurements.

35. The downhole communication network of claim 19, wherein one of the communicating devices is a pressure sensor secured to an outer surface of a wellbore tubular, and wherein one of the communicating interfaces used by the pressure sensor comprises the acoustic communicating interface, and the wherein the acoustic communicating interface comprises an acoustic transmitter and an acoustic communicating medium.

36. The downhole communication network of claim 19, wherein one of the plurality of devices is a sensor deployed in the downhole communication network within a distance from another of the plurality of devices such that more than one communicating interface may be employed to transmit and/or receive messages therebetween.

37. The method of claim 1, wherein the selecting optimizes one or more of the communicating rate, an effective life of a power source, an availability of a device, or energy use.

38. The downhole communication network of claim 19, wherein the selecting optimizes one or more of the communicating rate, an effective life of a power source, an availability of a device, or energy use.

39. The method of claim 1, wherein the one of the devices changes the communicating rate as necessary to maintain communication among the plurality of communicating devices.

40. The downhole communication network of claim 19, wherein the device changes the communicating rate as necessary to maintain communication among the plurality of communicating devices.

41. The method of claim 1, wherein at least one of the device attributes is optimized as a result of the selecting.

42. The downhole communication network of claim 19, wherein at least one of the device attributes is optimized as a result of the selecting.

43. The method of claim 1, wherein the communicating interfaces support both data communication and power transfer.

44. The downhole communication network of claim 19, wherein the communicating interfaces support both data communication and power transfer.

45. The method of claim 1, wherein the selection of the one of the communicating interfaces instead of the another communicating interface comprises selecting the acoustic communicating interface instead of the optical communicating interface, and vice versa.

46. The downhole communication network of claim 19, wherein the selection of the one of the communicating interfaces instead of the another communicating interface comprises selecting the acoustic communicating interface instead of the optical communicating interface, and vice versa.

* * * * *